Nov. 21, 1939. H. J. MURPHY 2,180,929
KNOB FASTENING INSTALLATION AND KNOB FASTENER

Filed Sept. 4, 1937

Inventor:
Howard J. Murphy.
by Walter S. Jones
Att'y.

Patented Nov. 21, 1939

2,180,929

UNITED STATES PATENT OFFICE 2,180,929

KNOB FASTENING INSTALLATION AND KNOB FASTENER

Howard J. Murphy, Greenwood, Mass., assignor to United-Carr Fastener Corporation, Cambridge, Mass., a corporation of Massachusetts Application September 4, 1937, Serial No. 162,546

4 Claims. (Cl. 287—53)

My invention relates to knobs and like fastening installations and fasteners for the same.

Referring to the drawing, in which I have illustrated a preferred form of my invention—

My invention relates to improvements in knob devices which may be of the type used on radio dial panels or automobile instrument panels and is particularly directed to an improved fastener member adapted to be quickly and easily assembled with an article of manufacture such as a control knob of the type described for the purpose of detachably securing a shaft member to the knob.

The knob installation and fastener member used in connection with the same, which are the subject of my present invention, are similar in form to a knob installation and fastener member described in connection with a prior application, Serial No. 152,581, filed July 8, 1937, but embody certain improvements over my prior invention which will be hereinafter described.

Referring to the installation shown in Figs. 1–4, I have provided a knob 1 which may be of plastic or other material to which is secured my improved fastener member 2. The fastener member 2 provides an efficient means for detachably securing a shaft member 3 (Fig. 3) to the knob. The shaft member 3 may be of the type adapted for connecting parts of radio and automobile apparatus with finger operative knob means disposed in operating position on a dial or instrument panel.

Figure 1:
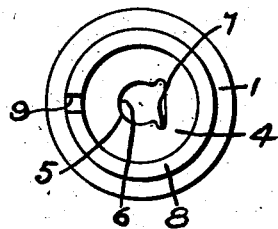
Figure 1 is a bottom view of a knob member before attachment of my improved form of fastener member thereto.
Figure 2:
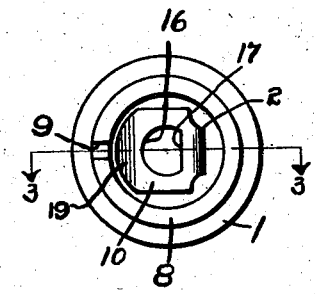
Fig. 2 is a bottom view similar to Fig. 1 showing my improved fastener member assembled with the knob member.

The knob member 1, in my preferred form, has a body portion providing an end face 4 at one end. An irregular opening 5 in the form of a bore extends from the end face 4 into the body of the knob in substantially right-angular relation to the plane of the end face, as most clearly shown in Fig. 3. The opening 5, in my preferred form, has a cross-sectional shape substantially as shown in Fig. 1 and comprises a portion 6 adapted to embrace the end of the shaft member 3 and an adjacent elongated portion 7 adapted to receive and hold an attaching means of the fastener member 2 for aiding in securing the fastener member to the knob. The knob member 1 preferably has a peripheral flange 8 extending beyond the end face 4 of the body portion of the knob and adapted to conceal the fastener member 2 when it is in permanent attachment to the knob. The flange 8 has an opening 9 in a side thereof, in my preferred form, so as to permit a tool to pass through the flange for engagement with a releasing portion of my fastener member for detaching the knob member from the shaft member.

Figure 5:
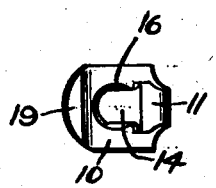
Fig. 5 is a top view of my improved fastener member per se.
Figure 4:
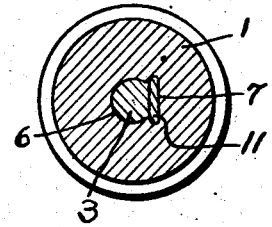
Fig. 4 is a section taken along the line 4—4 of Fig. 3.
Figure 6:
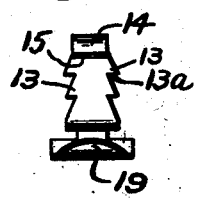
Fig. 6 is a front view of the fastener member shown in Fig. 5.
Figure 7:
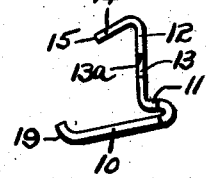
Fig. 7 is a side view of the fastener member shown in Figs. 5 and 6.

My improved fastener member 2, as most clearly shown in Figs. 5–7, is similar in form to certain fastener members illustrated and described in connection with my above-mentioned prior application, but is constructed in a way to have an additional attaching means in engagement with material adjacent to the bore of the knob over the attaching means provided by certain fastener members of the above-mentioned application whereby a more secure attachment is effected between the knob member and the fastener member when the parts are finally assembled together.

Figure 3:
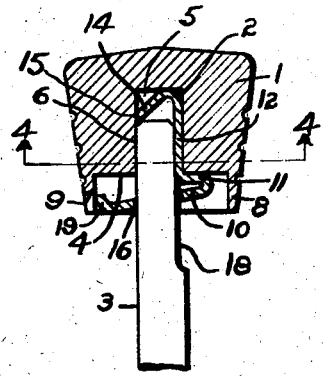
Fig. 3 is a section taken along the line 3—3 of Fig. 2 and showing a shaft member secured to the knob by means of my fastener member.

The fastener member 2 is preferably formed of one piece of sheet material and has a spring plate portion 10 at one end. Integral with one edge of the plate 10 I have provided a return-bend portion 11 extending beneath one side of the plate 10 and preferably spaced from the plate 10 (Figs. 3 and 7) so as to give resiliency to the plate portion, as will be understood by those skilled in the art. At the free end of the return-bend portion 11 I have provided an attaching means in the form of a prong-like portion 12 adapted to enter the portion 7 of the opening 5 for securing the fastener member to the knob. The prong-like attaching portion 12 has teeth 13 on opposed edges presenting shoulders 13ª which are adapted to engage material of the body portion of the knob member adjacent the opening 7 to aid in preventing detachment of the fastener member from the knob. As a means for securing the fastener member rigidly to the knob I have provided an attaching means, which is auxiliary to the attaching means 12, in the form of a spring tongue 14 integral with an opposite end of the attaching means 12 from that to which the return-bend portion 11 is joined. The spring tongue 14 is bent laterally at an angle to the attaching means 12 with the free end 15 of the tongue facing substantially toward that end of the fastener having the spring plate 10 (Figs. 3 and 7). It will be noticed that the spring tongue is constructed in such a way that the distance between edges of the tongue at the free end thereof and the attaching means 12 is greater than the diameter of the opening 5 whereby one of the edges of the free end of the tongue engages material of the knob adjacent the opening 6 when the spring tongue is finally seated within the opening (Fig. 3) so that if either the knob 1 or the fastener 2 is pulled relative to the other for the purpose of separating the parts, an edge of the free end of the tongue bites into the wall of the bore and resists such separation as it tends to flatten under stress.

The spring plate 10 has an aperture 16 therein for receiving an end of the shaft member 3 and is inclined relative to the end face 4 of the body of the knob so that in expanded position it may grip the shaft member by canting action (Fig. 3). It will be noted that the aperture 16 has a flat side 17 (Fig. 2) which cooperates with a flat side 18 of the shaft member 3 so as to prevent relative rotation of the parts when the same are in fastened relation. At the opposite end of the plate 10 from that with which the return-bend portion 11 is integral I have provided an ear-shaped releasing portion 19 which curves out of the plane of the plate 10 on that side of the plate upon which the return-bend portion 11 is disposed. The curved construction of the releasing portion forms a camming surface which serves to start contraction of the plate 10 in the direction of the end face 4 when engaged by a tool means extended through the opening 9 of the peripheral flange 8.

Assembly of the fastener member 2 with the knob member 1 is a relatively simple matter and is carried out through first moving the prong-like attaching means 12 of the fastener member into the opening 7 of the knob until the spring tongue 14 abuts the closed end of the opening 6, at which time the return-bend portion 11 engages the end face 4 of the knob. When the attaching means 12 is in final position within the opening 7, the teeth 13 engage material of the knob member adjacent the opening for preventing withdrawal of the knob. Also, when the fastener member is seated in said final position within the bore of the knob, the spring tongue 14 is compressed slightly so as to frictionally engage the wall of the bore (Fig. 3) with the result that the fastening action provided by the engagement of the tongue 14 with the wall of the bore and the fastening action provided by the engagement of the teeth 13 with the material adjacent the opening 7 combine to rigidly secure the parts together. When the fastener member is secured to the knob, the plate portion 10 is in inclined relation to the face 4 with the opening 16 slightly out of alignment with the shaft-receiving opening 6 of the body of the knob. Passage of the shaft member 3 through the opening 16 during assembly of the shaft member with the knob causes the plate 10 to contract whereby the opening 16 aligns with the opening 6 of the knob so as to permit the free end of the shaft 3 to extend through the spring plate into the bore of the knob. After pressure upon the shaft member for moving it into the bore of the knob has been released, the plate 10 expands so that material adjacent the aperture 16 engages the shaft member by a canting action. The shaft member is now securely attached to the knob member and may not be released until the plate 10 has been contracted sufficiently to substantially align the aperture 16 of the plate and the opening 6 of the bore.

Thus by my invention I have provided an installation of simple construction comprising a knob member and a fastener member so rigidly assembled together that there is no chance for separation of the parts during normal usage of the knob member.

Although I have illustrated and described a preferred embodiment of my invention, I do not wish to be limited thereby because the scope of my invention is best defined in the following claims.

I claim:
1. The combination with a shaft and an article of manufacture having a bore, of a fastener member having a resilient portion seated within said bore and engaging the material of said article adjacent said bore for attaching said fastener to said article, and an apertured plate portion surrounding and normally gripping said shaft as when biased with respect to a transverse plane through said shaft.

2. The combination with a shaft and an article of manufacture having a bore, of a fastener member having a resilient tongue portion at one end seated within said bore and engaging material of said article adjacent said bore, an apertured plate portion at the other end surrounding and normally gripping said shaft as when biased with respect to a transverse plane through said shaft, and an attaching means intermediate said tongue portion and said plate portion, said attaching means having an integral tooth portion engaging material of said article adjacent said bore whereby said tooth portion cooperates with said tongue portion to secure said fastener firmly to said article.

3. A fastener installation comprising an article of manufacture, a fastener member assembled with said article and a shaft member, said article having a shaft-receiving opening and a second opening for receiving an attaching means of said fastener member, said fastener member having a spring portion at one end seated within said shaft receiving opening and engaging the material of said article adjacent said opening, an apertured resilient plate portion at the other end disposed opposite the shaft-receiving opening of said article, said shaft extending through the aperture of said plate portion and into said shaft-receiving opening of said article, and said plate frictionally engaging said shaft for securing the fastener and shaft together, and an attaching means intermediate said spring portion and said plate portion, said attaching means being seated within said second opening and having means engaging material of said article adjacent said second opening for cooperating with said spring portion to secure said fastener firmly to said article.

4. The combination with a shaft and an article of manufacture having a bore of a fastener member having a resilient tongue portion at one end seated within said bore near its innermost end and engaging material of said article adjacent said bore at an angle of less than 90° to the axis of the bore, shaft-engaging means at the other end and attaching means providing the only means connecting said tongue portion and said shaft-engaging means, said attaching means having a projecting means engaging the material of said article adjacent said bore and cooperating with said tongue portion to secure said fastener firmly to said article.

HOWARD J. MURPHY.